United States Patent [19]

Genberg

[11] 4,219,210
[45] Aug. 26, 1980

[54] AUXILIARY TRAILER

[75] Inventor: Allan G. Genberg, Langley, Canada

[73] Assignee: L. Knight and Company Limited, Langley, Canada

[21] Appl. No.: 905,210

[22] Filed: May 12, 1978

[51] Int. Cl.² .......................................... B62D 53/06
[52] U.S. Cl. ................................. 280/401; 280/404; 280/405 A; 280/423 A
[58] Field of Search ............... 280/404, 423 R, 423 A, 280/143, 144, 145, 146, 147, 148, 401, 460 R, 426, 405 A

[56] References Cited

U.S. PATENT DOCUMENTS

| 2,126,819 | 8/1938 | Schawlem | 280/476 R |
|---|---|---|---|
| 2,605,113 | 7/1952 | Gilmore | 280/404 |
| 3,087,744 | 4/1963 | Tanenbaum | 280/404 |
| 3,438,652 | 4/1969 | Hoffacker | 280/81 R |
| 3,788,672 | 1/1974 | Tharp | 280/404 |
| 3,910,601 | 10/1975 | Michaud | 280/415 R |
| 4,017,094 | 4/1977 | Pilcher | 280/404 |

Primary Examiner—John J. Love
Assistant Examiner—Randall A. Schrecengost
Attorney, Agent, or Firm—Carver and Company

[57] ABSTRACT

An auxiliary trailer for towing behind a tractor and main trailer combination adapted to carry an elongated self supporting load. A forward end of the load is carried on a bunk on the tractor, and the bunk that normally supports the aft end of the load is removed and fitted on a turntable of the auxiliary trailer. A lower portion of the turntable fitted on the main trailer receives a complementary forward portion of the auxiliary trailer and the load now extends between bunks fitted on the tractor and the auxiliary trailer, the main trailer serving merely to support a forward end of the auxiliary trailer and to transmit turning forces to the auxiliary trailer. In this manner, the number of load bearing axles and spacing between the axles is increased, thus increasing capacity of the vehicle. Normal onboard load measuring gear is adaptable to indicate vehicle load. Equivalent structure for coupling the auxiliary trailer to the main trailer can be substituted for the turntables.

8 Claims, 8 Drawing Figures

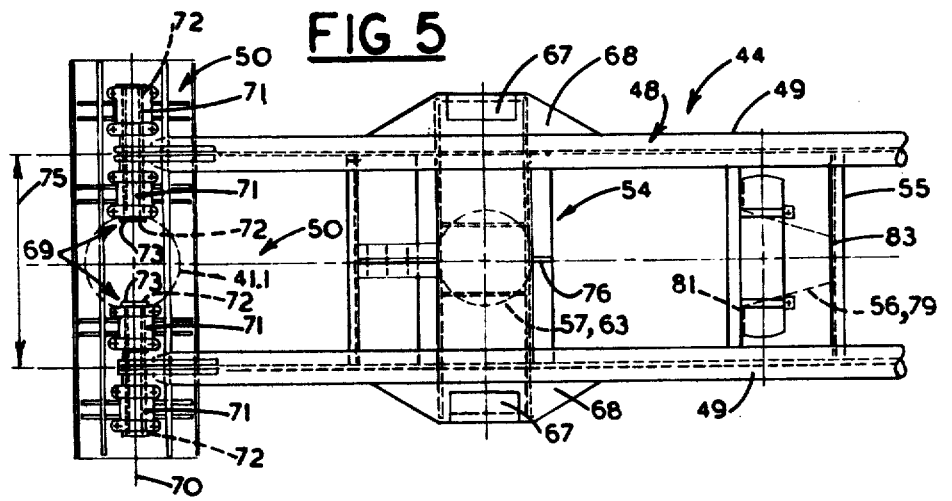
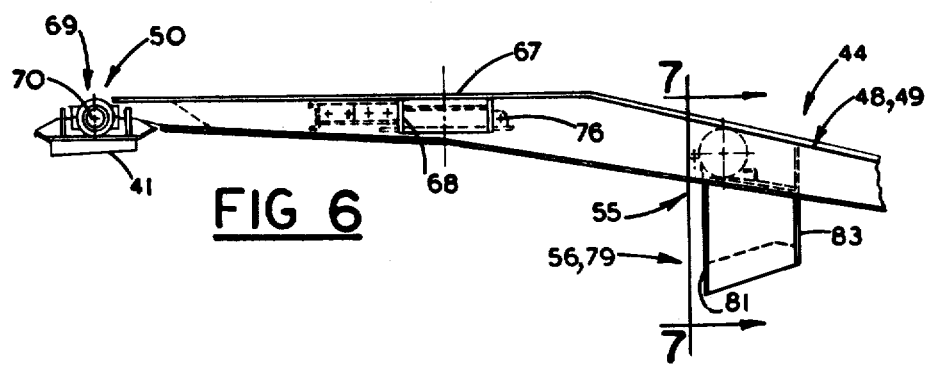
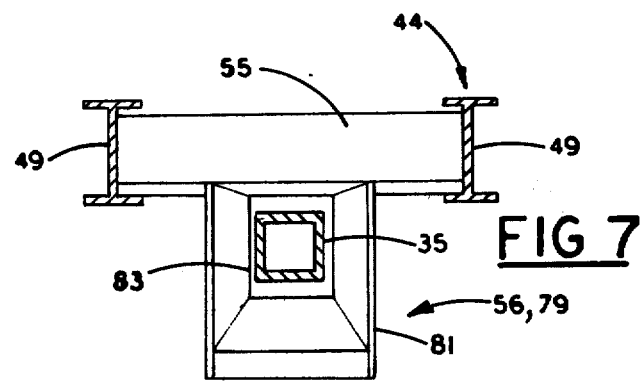

AUXILIARY TRAILER

BACKGROUND OF THE INVENTION

1. Field of the Invention

The invention relates to an auxiliary trailer adapted to be towed behind a conventional tractor and trailer combination to increase load carrying capacity of the tractor and trailer combination, particularly as applied to logging trucks.

2. Prior Art

Most highways have restrictions relating to vehicle weight and these are usually specified according to axle loads, number of wheels and spacings between adjacent axles or groups of axles. Heavy duty vehicles adapted to carry elongated self-supporting loads usually have a tractor and trailer connected together by a freely extendable trailer reach, the load itself being used to transmit towing forces to the trailer. Some prior art devices adapted to be fitted to such vehicles to increase load carrying capacity of the main trailer are complex and include load sharing hydraulic structures to resiliently mount additional rear axles aft of the trailer. Such devices are prone to damage and furthermore are expensive, and usually are fitted to the vehicle permanently and thus are subject to wear and increase operating costs when not directly in use as a load sharing structure.

SUMMARY OF THE INVENTION

The present invention reduces some of the difficulties and disadvantages of the prior art by providing an auxiliary trailer adapted to be towed behind an essentially conventional tractor and main trailer combination. The auxiliary trailer is relatively simple and inexpensive and, when the vehicle returns empty, the auxiliary trailer can be easily carried by the tractor. Conventionally, when a common tractor and trailer combination travels unloaded, the main trailer is carried piggyback on the tractor to improve traction of the driving wheels of the tractor and to reduce overall rolling resistance of the vehicle and wear of the trailer tires, etc. When returning empty, the present invention similarly can be carried piggyback with the main trailer on the tractor and thus further improve drive wheel traction with minimal increase in rolling resistance when compared with carrying the main trailer by itself.

An auxiliary trailer according to the invention is adapted for towing behind a tractor and main trailer combination for carrying an elongated, self-supporting load. The tractor has a forward coupling means co-operating with forward load supporting means to carry a forward end of the load. The main trailer has a rear axle supporting in part the main trailer, a main trailer reach extending forwardly from the rear axle to couple the main trailer to the tractor for towing therebehind, and a first coupling means adjacent the rear of the main trailer and positioned above the rear axle thereof. The auxiliary trailer is characterized by an auxiliary trailer rear axle supporting in part the auxiliary trailer, and an auxiliary trailer tongue extending forwardly from the auxiliary trailer rear axle. The auxiliary trailer tongue has a second coupling means complementary to the first coupling means of the main trailer to connect therewith for towing the auxiliary trailer behind the main trailer. The second coupling means cooperates with the tongue and the first coupling means so as to space the tongue from the main trailer to provide clearance therefrom and to permit relative upwards and downwards pitching of the trailers relative to each other. The forward end of the tongue is free of upwardly extending structure which would tend to interfere with the load passing above the first coupling means. An aft coupling means is positioned on the auxiliary trailer tongue rearwardly of the second coupling means and forwardly of the auxiliary trailer rear axle and is adapted to co-operate with aft load supporting means to support an aft portion of the load to obtain desired axle loading.

A detailed disclosure following, relating to the drawings, describes a preferred embodiment of the invention which is capable of expression in structure other than that particularly described and illustrated.

DESCRIPTION OF THE DRAWINGS

FIG. 5 is a simplified fragmented top plan view of a forward portion of the auxiliary trailer, FIG. 6 is a simplified fragmented side view of the forward portion of the auxiliary trailer of FIG. 5, showing a main trailer reach connection for piggyback carrying, FIG. 7 is a fragmented simplified section on line 7—7 of FIG. 6 showing relative positions of the reach connection and the reach of the main trailer when the trailers are carried piggyback on the tractor.

DETAILED DISCLOSURE

FIGS. 1 through 4

Figure 1:
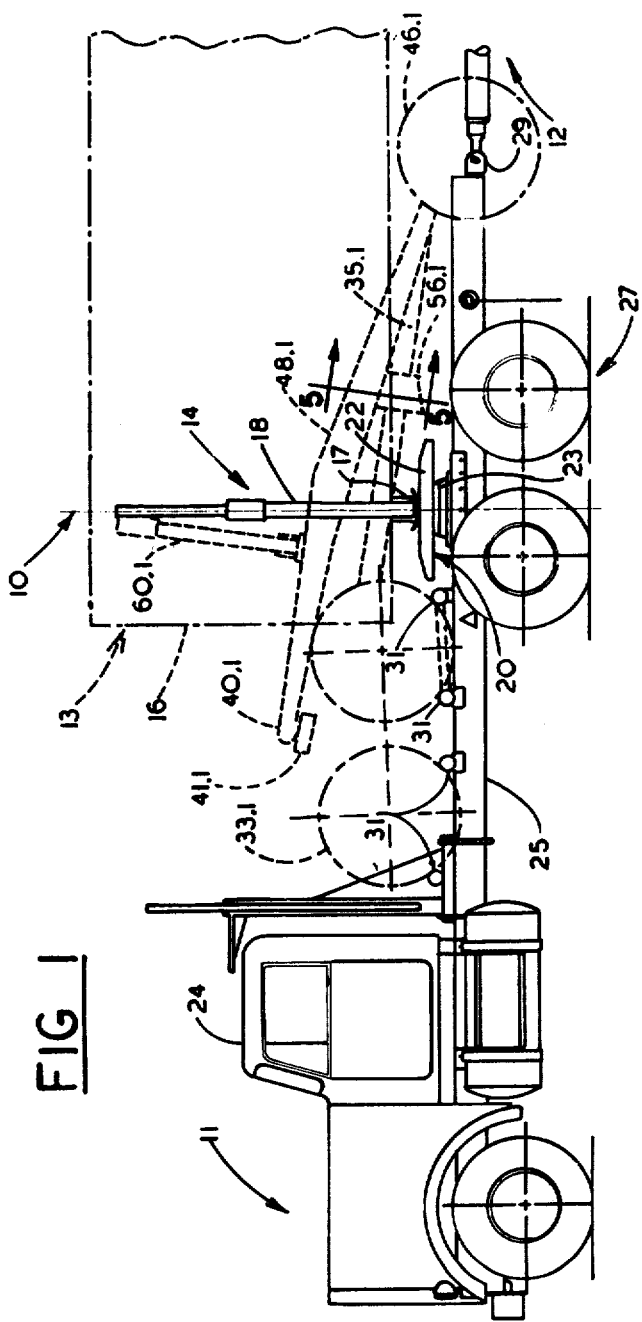
FIG. 1 is a simplified fragmented side elevation of a tractor and forward portion of a main trailer showing a forward load supporting means, and means for carrying the main and auxiliary trailers when unloaded.
Figure 3:
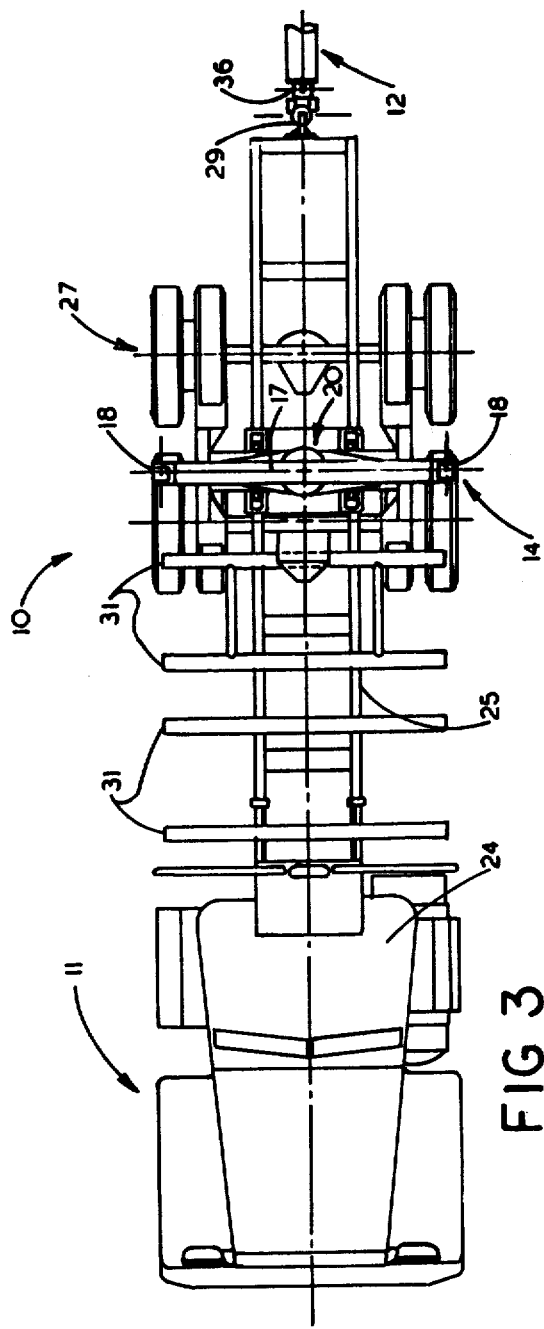
FIG. 3 is a simplified fragmented top plan of FIG. 1 showing the tractor and the forward portion of the main trailer.

Referring particularly to FIGS. 1 and 3, a conventional tractor and trailer combination 10 has a tractor 11 and a trailer 12, the tractor 11 towing the trailer 12 which is herein termed "main trailer". The tractor and trailer combination is a typical heavy goods vehicle particularly adapted to carry an elongated self-supporting load, for example logs as in a logging truck, but such vehicles can also carry other self-supporting loads such as steel or concrete structural members or pipes. The load is shown diagrammatically in broken outline and is designated 13 and the tractor has a forward load supporting means 14 to support a forward portion 16 of the load. The load supporting means 14 is characterized by a bunk 17 and a pair of spaced stakes 18 extending upwardly from the bunk to accept and support a forward portion of the load therebetween. The bunk is mounted on a first turntable 20 which permits the bunk to swivel as the combination describes a turn, as is common practice. The tractor has a cab 24 and an aft framework or chassis 25 carrying a conventional driven rear axle pair 27. The first turntable 20 is conventional and has complementary upper and lower members 22 and 23 respectively, commonly called a cup and saucer respectively. The lower member 23 is secured to the chassis adjacent the rear axle, and the upper member 22 is secured to the bunk 17 to swivellably mount the bunk abovethe rear axle as is common practice. The turntable 20 thus serves as a forward coupling means co-operating with the forward load supporting means. Load measuring means, not shown, such as an onboard electronic scale member, can be incorporated in the first turntable to provide a remote read-out of load above the rear axle pair 27 following common practice. An aft portion of the chassis carries a trailer coupling 29 for coupling the main trailer 12 to the tractor for towing therebehind, and a forward portion of the chassis carries spaced wheel support means 31 to accept wheels of the main trailer when the main trailer is carried piggyback, as will be described. Note that the means 31 are forward of the bunk 17 which contrasts with common practice in which the wheel support means are usually aft of the bunk.

Figure 2:
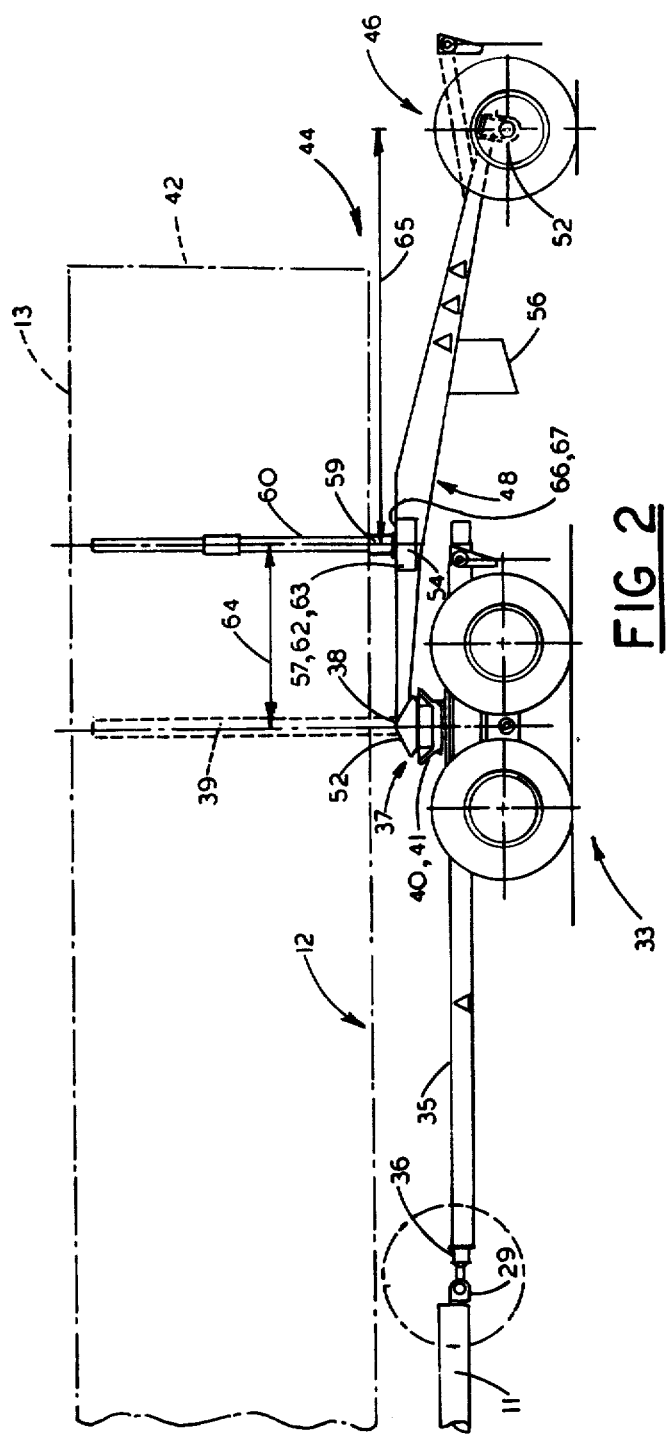
FIG. 2 is a simplified fragmented side elevation of a main trailer and an auxiliary trailer according to the invention, showing an aft load supporting means supporting an aft portion of the load, and is a continuation aft of FIG. 1.
Figure 4:
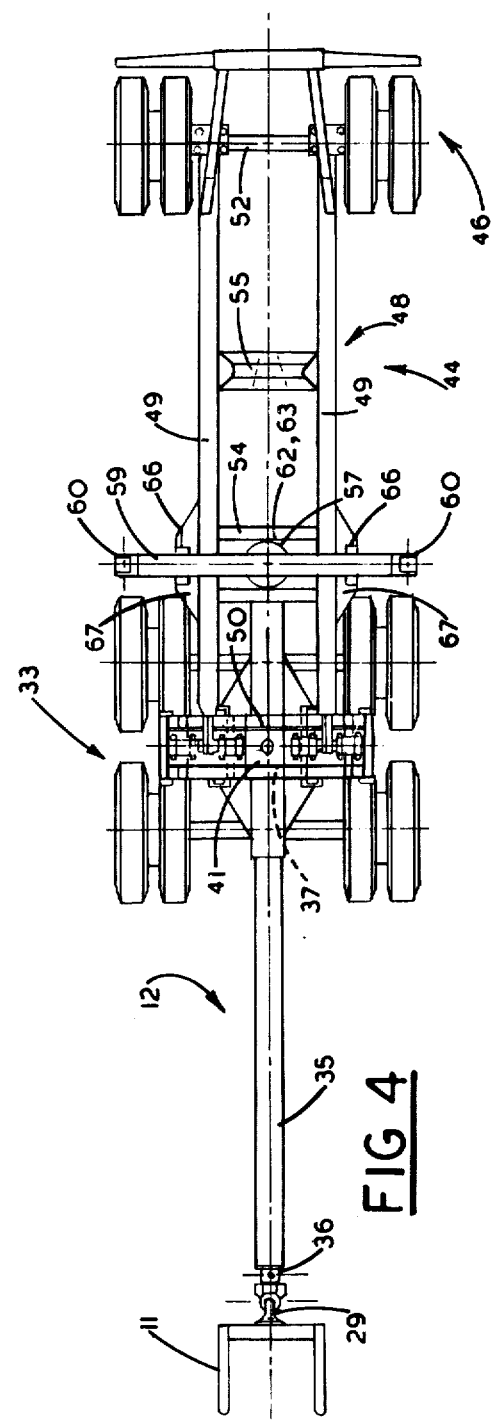
FIG. 4 is a simplified fragmented top plan of FIG. 2 showing the main and auxiliary trailers, and is a continuation aft of FIG. 3.

Referring particularly to FIGS. 2 and 4, the main trailer 12 has a rear axle pair or bogey 33, namely a pair of dual wheel axles adjacent an aft portion of the trailer which supports in part the main trailer. The trailer 12 has a main trailer reach 35 extending forwardly from the rear axle, and adapted to couple the main trailer to the tractor with the trailer coupling 29. The trailer reach 35 has a conventional compensator 36 which is a telescoping means which permits longitudinally sliding between the coupling 29 and reach 35 when the tractor and trailer combination negotiates a curve. Typical extension of the compensator may be in the range of 1 meter for a radius of turn of approximately 10 meters to centerline of the vehicle. As is well known in the trade, the compensator transmits essentially only lateral turning forces to the reach 35, whilst the load transmits towing forces to the rear axle.

The main trailer has a second turntable 37 having a second turntable lower member 40 adjacent the rear of the main trailer and a second turntable upper member 41 cooperating therewith. As shown in broken outline in FIG. 2 only, in a conventional prior art logging truck, the second turntable 37 would cooperate with a bunk 38 and stakes 39, and the forward portion 16 of the load would be carried by the bunk 17 and stakes 18 mounted on the first turntable 20, and an aft portion 42 of the load would be carried by the bunk 38 and the stakes 39 mounted on the second turntable 37. The prior art arrangement has been used for many years with great success but, as stated previously, highway load restrictions can limit somewhat operation of the vehicle without some means of increasing capacity.

FIGS. 1 through 6

Referring to FIGS. 2,4, 6, the present invention provides an auxiliary trailer 44 adapted to be towed behind the main trailer after a simple modification of the conventional tractor and main trailer combination. Use of the auxiliary trailer increases load carrying capacity of the conventional combination with a relatively small financial investment. As will be described, the auxiliary trailer is adaptable to be towed behind many different types of conventional main trailers using existing couplings compatible with the main trailer. The invention is described having conventional turntable members for coupling the auxiliary trailer to the main trailer. Thus the existing lower member 40 on the main trailer can be used "as is" and no modification is required, thus simplifying conversion. However, alternative coupling means can be substituted.

As seen in FIGS. 2 and 4, the auxiliary trailer 44 has an auxiliary trailer rear axle 46 supporting in part the auxiliary trailer. The trailer 44 has an auxiliary trailer tongue 48 extending forwardly from the auxiliary trailer rear axle, the tongue having the second turntable upper member 41 at a forward and thereof to connect with the second turntable lower member 40 fitted adjacent an aft portion of the main trailer for towing therebehind.

The auxiliary trailer tongue 48 has a pair of similar longitudinal members 49 secured together at forward and aft ends by cross members 50 and 52, the member 50 cooperating with the second turntable upper member 41, and the member 52 being an axle tube of the rear 46. Other means to secure together the longitudinal members 49 can be substituted. Forward and after intermediate cross members 54 and 55 extend between the members 49 and provide additional supports without stiffening the trailer excessively so that the trailer can deflect torsionally to accommodate lateral road surface variations. The rear axle 46 is secured without resilient suspension means to aft ends of the members 49 and thus twisting of the members 49 must be sufficient to absorb road irregularities. The cross member 55 carries a reach connector 56 used when carrying both trailers as will be described.

The intermediate cross member 54 is referred to as a bolster and, as best seen in FIGS. 2 and 4, carries a third turntable 57 which journals a bunk 59 with a pair of stakes 60 to support an aft end of the load. The third turntable has an upper member 62 and a lower member 63 generally similar to the second turntable upper and lower members 41 and 40, the member 62 being secured to the bunk and the member 63 being secured to the bolster 54. The bunk 59 and stakes 60 can, in fact, be the previously mentioned conventional bunk 38 and stakes 39, which are shown in broken outline only in FIG. 2 in the conventional second turntable position adjacent the rear axle of the main trailer. Thus the conversion can be simply performed by removing from the second turntable 37 the respective second turntable upper member complete with the bunk 38 and stakes 39, followed by the re-positioning the respective upper member, the bunk 38 and the stakes 39 on the third turntable lower member 63 to now serve as the third turntable upper member 62 carrying the bunk 59 and stakes 60.

The third turntable 57 is positioned on the auxiliary trailer tongue rearwardly of the second turntable upper member at a forward spacing 64, the exact position being dependent on load transfer requirements to the rear axle. A ratio of the forward spacing 64 to aft spacing 65 between turntable 57 and rear axle 46 determines load sharing between the axle pair 33 and the axle 46. A typical range of ratios of spacing 64 to 65 can be between 1:10 and 1:1 but preferably the range would be between 1:5 and 1:2. Thus, in summary it can be seen that the auxiliary trailer has a third turntable lower member positioned on the auxiliary trailer tongue rearwardly of the second turntable upper member and forwardly of the rear axle 46 to serve as an aft coupling means adapted to co-operate with load supporting means to support the aft portion 42 on the load.

It can be seen that the particular embodiment described is a logging truck adapted to carry logs positioned on swivellably mounted horizontal bunks having vertically extending stakes at ends of the bunks, as is common practice in the logging industry. Other load supporting means can be substituted for other self-supporting loads, for example if pipes or concrete beams are to be carried, suitable complementary cradles and clamps can be provided on the first and third turntable upper members so as to accept the load to transfer towing forces and to prevent shifting of the load during travelling. Clearly, if the second turntable has an on-board electronic scale member, loading on the bunk 59 is transmitted to the second turntable and, with suitable adjustment for load carried by the rear axle 46, and loading on the forward load supporting means 14, total payload of the vehicle can be easily estimated.

Referring to FIGS. 2, 5 and 6 the auxiliary trailer 44 has a pair of spaced intermittent contact scuff plates 67, the plates being mounted on similar laterally extending supports 68 positioned on either side of the third turntable lower member 63. The scuff plates are positioned slightly below and occasionally contact a lower surface of the bunk 59 when the bunk rocks laterally and thus serve to limit lateral rolling of the bunk due to variations in road surfaces, thus improving lateral stability of load carried on the auxiliary trailer. The intermittent contact scuff plates thus serve as lateral support means on either side of the third turntable lower member to cooperate with the load supporting means to reduce lateral rolling of the load and alternative means can be substituted to similarly improve lateral stability.

FIGS. 5 and 6

Clearly, because the auxiliary trailer tongue does not transmit towing forces, the second turntable 41 can similarly be designed to sustain mostly vertical loading and this does not require extensive modification from the normal cup and saucer. However, one aspect of using the turntable as a forward coupling for the auxiliary trailer does require modification and this relates to relative pitching between the trailers. To this end the second turntable upper member 41 has transversely disposed trunnion mounting means 69 mounted on the forward cross member 50 so as to cooperate with a forward end of the trailer tongue 48 to journal the second turntable upper member to the auxiliary trailer tongue about a transverse axis 70.

The means 69 includes two pairs of transversely aligned shaft journals 71, one pair of which straddles forward ends of each of the members 49 to form four aligned shaft journals concentric with the axis 70, each journal 71 having a tough elastomeric sleeve 72 therein. A hinge shaft 73 is secured rigidly to and extends equally from either side of the forward ends of each of the members 49 so that the shafts are aligned with each other and are concentric with the axis 70. The shafts 73 are accepted in respective pairs of sleeves 72 which grip the shafts lightly and provide slight rotational restraint whilst providing a resilient bearing to reduce shock load transfer across the journals. For larger relative rotation between the trailers, the shafts 73 slip within the respective sleeves. Thus it can be seen that the means 69 permits forward and aft rocking between the trailers about the axis 70 to accommodate longitudinal variations in road surfaces. That is the trunnion mounts serve as means to accommodate pitching movement of the auxiliary trailer relative to the main trailer as a result of longitudinal variations in the road surface. Other means to accommodate the pitching movement can be substituted. To accommodate the pitching movement between the trailers, there must be clearance between the rear of the main trailer and the tongue. This is necessary because as seen in FIG. 2, should the auxiliary trailer drop relative to the main trailer, for example when negotiating severe road surface undulations, interference would likely occur between the tongue and the rear of the main trailer. Thus the second coupling means cooperates with the tongue and the first coupling means to space the tongue from the main trailer so as to provide clearance therefrom and to permit relative upwards and downwards rocking of the trailers relative to each other. Thus transfer of load from the tongue to the main trailer is through the coupling means only. Also a forward end of the tongue should be free of upwardly extending structure which would tend to interfere with the load passing above the coupling means should the vehicle combination turn or negotiate undulations. It can be seen that hinge axial length 75 is sufficiently large to provide a twisting restraint at the forward end of the trailer 44. Thus, differences in height of the wheels of the rear axle 46 (FIGS. 2 and 4 only) are accommodated by longitudinal twisting of the tongue 48.

FIGS. 1, 3 and 5 through 7

Referring to FIG. 1, when the tractor is travelling unloaded, the main trailer and auxiliary trailer are carried piggyback on the rear portion of the tractor. It can be seen that the main trailer rear axle bogey 33, shown in FIG. 1 in broken outline at 33.1, is carried on the support means 31 and the main trailer reach 35, shown in broken outline at 35.1, extends rearwardly from the rear axle to a position adjacent the coupling 29. In this position, the rear axle or bogey 33 is supported on the wheel support means 31 between the cab 24 and the first turntable 20, with the reach 35 extending rearwardly from the bogey between the stakes 18 of the forward load supporting means 14. This contrasts with the common practice with most conventional logging trucks where the rear bogey is positioned aft of the first turntable and the reach extends forwardly.

The auxiliary trailer 44 is positioned with the auxiliary trailer tongue 48, shown as 48.1, extending forwardly and above the reach 35, so that a forward portion of the tongue is adjacent and above the axle 33 of the main trailer, the second turntable upper member 41, shown in broken outline at 41.1, being on the forward portion of the tongue. The rear axle of the auxiliary trailer is shown at 46.1 in broken outline adjacent the coupling 29 and chains or other tie down means, not shown, can be used to steady the two trailers. An additional steadying means is also provided as follows. Referring particularly to FIGS. 5 and 6, the auxiliary trailer 44 has the reach connector 56 extending downwardly from the auxiliary trailer tongue 48, the connector also being shown in full outline in FIG. 2 and in broken outline at 56.1 in FIG. 1. The reach 35 of the main trailer passes through the connector 56 thus restricting lateral movement of the auxiliary trailer relative to the main trailer. Thus the connector 56 is adapted to accept the main trailer reach 35 when the reach extends in parallel relationship below the auxiliary trailer tongue. The stakes 60 can be left in position as shown at 60.1 in FIG. 1, and thus the main trailer and auxiliary trailer can be carried completely on the tractor so as to transfer additional load to the rear axle 27 of the tractor, thus improving traction and simultaneously reducing rolling resistance and wear of trailer tires when travelling unloaded.

Referring particularly to FIGS. 5 through 7, the connector 56 is a loop 79 extending downwardly from the aft intermediate cross member 55 extending between the longitudinal members 49, and has a relatively wide forward end 81 to facilitate threading of the reach 35 therethrough, with a relatively narrow aft end 83 which provides greater restriction for relative movement between the reach 35 and connector 56. Thus the connector is an aftwards tapering, square-sectioned tube resembling a truncated pyramid which permits easy threading of the main trailer reach through the connector to interconnect the tongue 48 and the reach 35. When the reach is threaded through the connector, both trailers are hoisted simultaneously onto the rear of the tractor. The trailer 44 has a lifting bracket 76 to accept a hook, not shown, from a crane to hoist the two trailers on and off the chassis of the tractor.

FIG. 8

Figure 8:
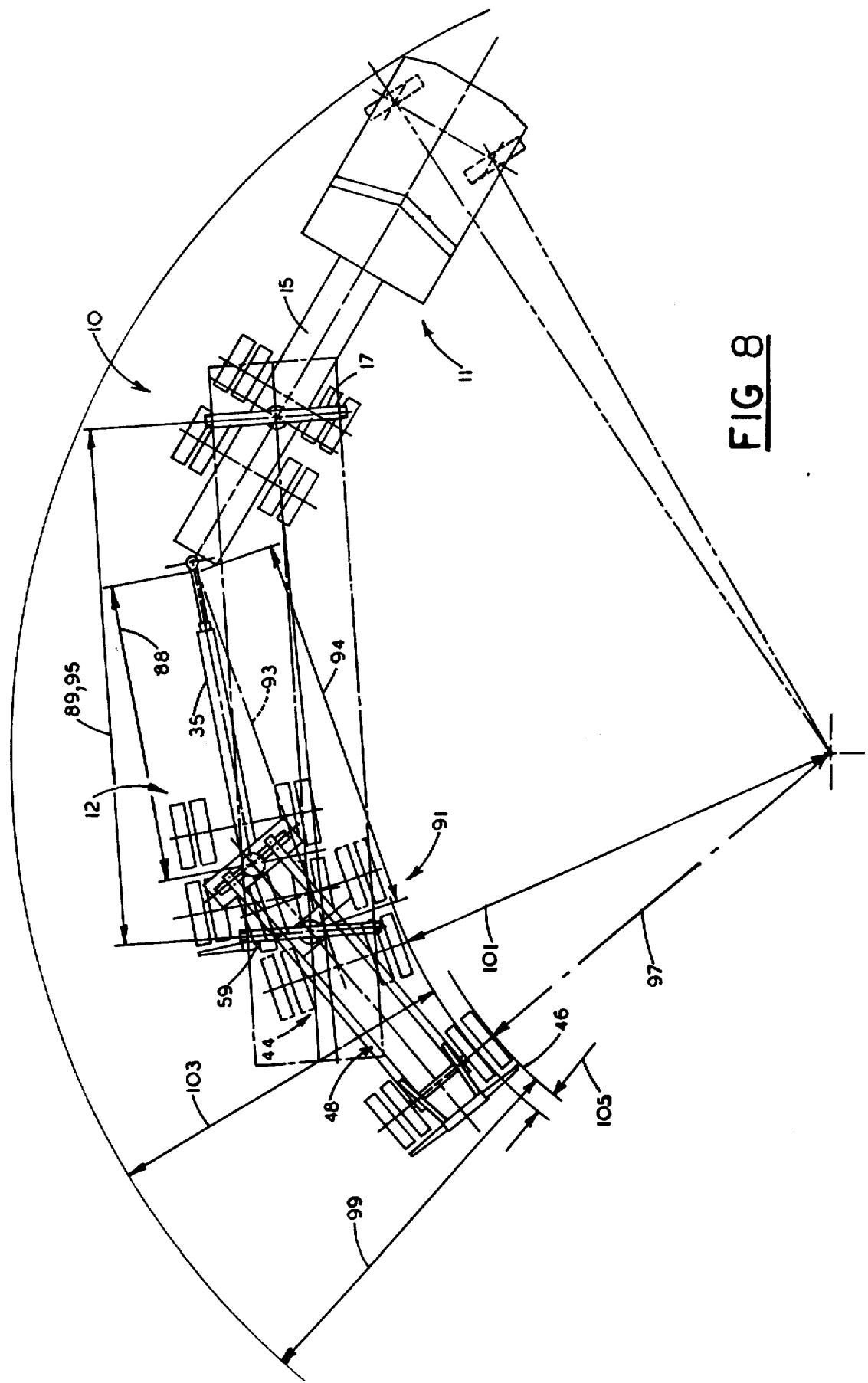
FIG. 8 is a simplified continuous turn tracking layout of a tractor and main trailer combination towing an auxiliary trailer according to the invention in a minimum radius turn, compared with a conventional tractor and main trailer combination with bunk spacings between the two combinations being equal.

FIG. 8 is a diagram comparing continuous turn tracking layouts of the combination 10 towing the auxiliary trailer 44 and a conventional tractor and trailer combination, the diagram being drawn so that each combination uses the same tractor 11 but different main trailers. The main trailers have variable reach lengths due to the telescopic sliding compensators but, for this comparison, actual bunk spacings for the combinations are selected to be equal so that maximum reach lengths, which occur during minimum radii turns, are therefore different. The previously described combination 10 has the main trailer 12 with the main trailer reach 35 which has a maximum reach length 88 which produces, with the auxiliary trailer 44 with the tongue 48, a first bunk spacing 89 between centers of the bunk 17 on the tractor and the bunk 59 on the auxiliary trailer 44.

The second tractor and trailer combination has a second main trailer 91 having a trailer reach 93, centreline only of which is shown. The reach 93 has a maximum length 94, the length 94 being longer than the length 88 so that a bunk on the trailer 91 coincides with the bunk 59 on the auxiliary trailer 44. Thus a second bunk spacing 95 between the bunk on the trailer 91 and the bunk 17 on the tractor equals the first bunk spacing 89. Thus load is supported on the two combinations at an equal bunk spacing for a fair comparison of turn radii.

The combination 10 with the main trailer has a minimum radius of turn 97 taken at the rear axle 46, and a swept path width 99. The combination using the second main trailer 91 with a lengthened reach 93 to equalize bunk centers has a mimum radius of turn 101 and a swept path width 103.

It can be seen that the combination 10 with the auxiliary trailer 44 produces a wider swept path by an amount 105 than the combination solely with the second main trailer 91. The amount 105 is the difference between minimum radii 97 and 101 of the aftmost rear axles of the combinations, and this is about 0.4 meters for the second bunk spacing 95 of about nine meters. Thus additional maneuvering area requirement for the equivalent combination 10 is negligible which permits the combination 10 to operate in most areas suitable for conventional tractor and trailer combinations.

Permanent Modification

From the above, referring to FIG. 8, it can be seen that conversion from an auxiliary trailer to the combination of the invention usually requires shortening of the main trailer reach 35 from the length 94 to the length 88, usually by about three meters. Also, as seen in FIGS. 1 and 3, to permit the rear axle bogie 27 to be carried between the bunk 17 and the cab 15, transverse wheel support means are removed from a rear portion of the chassis 25 and positioned as shown at 31. The above permanent modifications are made to the existing tractor and trailer and thus has little effect for operation of the standard tractor and trailer when used without the auxiliary trailer.

OPERATION

When travelling without load, the tractor carries the auxiliary and main trailers on its chassis as shown in broken outline in FIG. 1. The trailers can be unloaded from the tractor with conventional equipment and the main trailer is then coupled to the tractor in a normal manner except that the upper member 41, the bunk 38 and the stakes 39 normally carried at the second turntable 37 are omitted. This leaves the lower member 40 of the second turntable 37 free to accept the second turntable upper member 41 at a forward end of the auxiliary trailer. The bunk 59 and stakes 60 are now positioned in the auxiliary trailer at the third turntable position, usually simply by removing them from the member 40 and fitting them to third turntable lower member 63. The combination is now loaded so that the load extends between the bunk carried on the auxiliary trailer and the forward bunk. The load is thus secured so that the forward portion 16 thereof is supported by the bunk 17 and the stakes 18 on the tractor, and the aft portion 42 thereof is supported by the bunk 59 and the stakes 60 on the auxiliary trailer. The additional wheels and spacing therebetween permit the combination to operate with axle loadings which are lower than would have been attainable carrying the same load without the simple conversion using the auxiliary trailer.

With experienced operators, once the tractor and trailer have been permanently modified as above, the above conversion to use the auxiliary trailer can be performed in about two hours. All onboard load measuring devices can be still used and there is little change in driving characteristics apart from a small decrease in minimum radius of turn which results in a small increase in swept path width of the combination. Other factors relating to use of the combination remain essentially unchanged apart from reversing or "backing-up" procedures. Whilst reversing the combination is more difficult than with a single trailer, it is very similar to the procedure with a conventional auxiliary or "pony" trailer.

ALTERNATIVES AND EQUIVALENTS

As previously stated, the auxiliary trailer is towed behind the main trailer using conventional turntable members to simplify conversion. If desired, a conventional fifth wheel assembly, not shown, can be substituted for the second turntable lower member 40 on the main trailer, which is defined as a first coupling means, and a conventional complementary king pin, not shown, can be substituted for the second turntable upper member 41 on the auxiliary trailer, which is defined as a second coupling means. Whilst this substitution is more time consuming than the previously described embodiment, it can be less costly. Alternatively conventional complementary pintle eye and hook coupling means can be similarly substituted for the turntable members 40 and 41.

In all alternative structures exemplified above, and in all equivalents, a first coupling means adjacent the rear of the main trailer connects with a second coupling means on the auxiliary trailer tongue. The coupling means are complementary and permit the auxiliary trailer to be towed behind the main trailer.

I claim:

1. An auxiliary trailer for towing behind a tractor and main trailer combination adapted to carry an elongated self-supporting load, in which: the tractor has a forward coupling means cooperating with forward load supporting means to carry a forward end of the load; and the main trailer has: a rear axle supporting in part the main trailer, a main trailer reach extending forwardly from the rear axle to couple the main trailer to the tractor for towing therebehind, and a first coupling means adjacent the rear of the main trailer, and the tractor is adapted to carry the trailer when traveling unloaded; the auxiliary trailer being characterized by:
   (a) an auxiliary trailer rear axle supporting in part an auxiliary trailer,
   (b) an auxiliary trailer tongue extending forwardly from the auxiliary trailer rear axle, the tongue having a second coupling means complementary to the first coupling means of the main trailer to connect therewith for towing the auxiliary trailer behind the main trailer,
   (c) an aft coupling means positioned on the auxiliary trailer tongue rearwardly of the second coupling means and forwardly of the auxiliary trailer rear axle and adapted to cooperate with aft load supporting means to support an aft portion of the load to obtain desired axle loading,
   (d) a connector to interconnect the main trailer reach and the auxiliary trailer tongue when the tractor carries the trailers and the tongue and reach extend parallel to each other and are spaced apart vertically relative to each other.

2. An auxiliary trailer as claimed in claim 1 in which:
   (a) the auxiliary trailer has spaced lateral support means on either side of the aft coupling means to cooperate with the aft load supporting means to reduce lateral rolling of the load, thus improving lateral stability of the load.

3. An auxiliary trailer for towing behind a tractor and main trailer combination adapted to carry an elongated self-supporting load, in which: the tractor has a forward coupling means cooperating with forward load supporting means to carry a forward end of the load; and the main trailer has: a rear axle supporting in part the main trailer, a main trailer reach extending forwardly from the rear axle to couple the main trailer to the tractor for towing therebehind, and a first coupling means adjacent the rear of the main trailer, and the tractor is adapted to carry the trailers when traveling unloaded; the auxiliary trailer being characterized by:
   (a) an auxiliary trailer rear axle supporting in part an auxiliary trailer,
   (b) an auxiliary trailer tongue extending forwardly from the auxiliary trailer rear axle, the tongue having a second coupling means complementary to the first coupling means of the main trailer to connect therewith for towing the auxiliary trailer behind the main trailer,
   (c) an aft coupling means positioned on the auxiliary trailer tongue rearwardly of the second coupling means and forwardly of the auxiliary trailer rear axle and adapted to cooperate with aft load supporting means to support an aft portion of the load to obtain desired axle loading,
   (d) a reach connector interconnecting the auxiliary trailer tongue and main trailer reach when the tractor carries the trailers and the main trailer reach extends in parallel relationship to the auxiliary tongue, and a forward portion of the auxiliary trailer tongue is adjacent and above the axle of the main trailer.

4. An auxiliary trailer as claimed in claim 3 in which the reach connector is characterized by:
   (a) a loop extending downwardly from the auxiliary trailer tongue to accept the main trailer reach threaded therethrough.

5. An auxiliary trailer for towing behind a tractor and main trailer combination adapted to carry an elongated self-supporting load, in which: the tractor has a forward coupling means cooperating with forward load supporting means to carry a forward end of the load and is adapted to carry the trailers piggyback when travelling unloaded; and the main trailer has: a rear axle supporting in part the main trailer, a main trailer reach extending forwardly from the rear axle to couple the main trailer to the tractor for towing therebehind, and a first coupling means adjacent the rear of the main trailer; the auxiliary trailer being characterized by:
   (a) an auxiliary trailer rear axle supporting in part the auxiliary trailer,
   (b) an auxiliary trailer tongue extending forwardly from the auxiliary trailer rear axle, the tongue having a second coupling means complementary to the first coupling means of the main trailer to connect therewith for towing the auxiliary trailer behind the main trailer, and a reach connector adapted to cooperate with the main trailer reach when the tongue and reach extend parallel to each other and are spaced apart vertically relative to each other,
   (c) an aft coupling means positioned on the auxiliary trailer tongue rearwardly of the second coupling means and forwardly of the auxiliary trailer rear axle and adapted to cooperate with aft load supporting means to support an aft portion of the load to obtain desired axle loading.

6. An auxiliary trailer as claimed in claim 5 in which the reach connector is further characterized by:
   (a) a loop extending downwardly from the auxiliary trailer tongue to accept the main trailer reach threaded therethrough.

7. An auxiliary trailer as claimed in claim 5 in which:
   (a) the auxiliary trailer has spaced lateral support means on either side of the aft coupling means to cooperate with the aft load supporting means to reduce lateral rolling of the load, thus improving lateral stability of the load.

8. An auxiliary trailer for towing behind a tractor and main trailer combination adapted to carry an elongated self-supporting load, in which: the tractor has a forward coupling means cooperating with forward load supporting means to carry a forward end of the load; and the main trailer has: a rear axle supporting in part the main trailer, a main trailer reach extending forwardly from the rear axle to couple the main trailer to the tractor for towing therebehind, and a first coupling means adjacent the rear of the main trailer; the auxiliary trailer being characterized by:
(a) an auxiliary trailer rear axle supporting in part the auxiliary trailer,
(b) an auxiliary trailer tongue extending forwardly from the auxiliary trailer rear axle, the tongue having: a second coupling means complementary to the first coupling means of the main trailer to connect therewith for towing the auxiliary trailer behind the main trailer; a pair of spaced apart longitudinal members and means securing the longitudinal members together at forward and aft ends thereof to permit the trailer to deflect torsionally to accommodate lateral road surface variations; a cross member extending between the longitudinal members to carry the aft coupling means thereon,
(c) an aft coupling means positioned on the auxiliary trailer tongue rearwardly of the second coupling means and forwardly of the auxiliary trailer rear axle and adapted to cooperate with aft load supporting means to support an aft portion of the load to obtain desired axle loading.

* * * * *